United States Patent
Schwarte et al.

(10) Patent No.: US 11,187,140 B2
(45) Date of Patent: Nov. 30, 2021

(54) METHOD FOR OPERATING AN INTERNAL COMBUSTION ENGINE, DUAL FUEL INJECTOR DEVICE, AND INTERNAL COMBUSTION ENGINE DESIGNED FOR CARRYING OUT SUCH A METHOD

(71) Applicant: MTU Friedrichshafen GmbH, Friedrichshafen (DE)

(72) Inventors: Joachim Schwarte, Langenargen (DE); Samuel Vogel, Bad Waldsee (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 16/829,715

(22) Filed: Mar. 25, 2020

(65) Prior Publication Data

US 2020/0240320 A1    Jul. 30, 2020

Related U.S. Application Data

(63) Continuation of application No. PCT/EP2018/080679, filed on Nov. 8, 2018.

(30) Foreign Application Priority Data

Nov. 10, 2017   (DE) ..................... 10 2017 220 108.8

(51) Int. Cl.
*F02B 3/06* (2006.01)
*F02D 41/00* (2006.01)
(Continued)

(52) U.S. Cl.
CPC ............ *F02B 3/06* (2013.01); *F02D 41/0025* (2013.01); *F02B 2075/125* (2013.01);
(Continued)

(58) Field of Classification Search
CPC .. F02B 3/06; F02B 2075/125; F02B 2075/14; F02D 41/00; F02D 41/0025; F02D 41/19;
(Continued)

(56) References Cited

U.S. PATENT DOCUMENTS

| 4,748,949 A | 6/1988 | Steiger et al. |
| 5,365,902 A | 11/1994 | Hsu |

(Continued)

FOREIGN PATENT DOCUMENTS

| DE | 10 2015 225 073 A1 | 6/2017 |
| DE | 10 2016 003 398 A1 | 9/2017 |

OTHER PUBLICATIONS

International Search Report dated Jan. 28, 2019 for International Application No. PCT/EP2018/080679 (5 pages).
(Continued)

*Primary Examiner* — John Kwon
*Assistant Examiner* — Johnny H Hoang
(74) *Attorney, Agent, or Firm* — Taylor IP, P.C.

(57) ABSTRACT

A method for operating an internal combustion engine including a step of concurrently introducing at least two combustible fuel jets into a combustion chamber of an internal combustion engine. A first combustible fuel jet of the at least two combustible fuel jets is ignited at an ignition time point. In a first operating mode of the internal combustion engine a second combustible fuel jet which is different from the first combustible fuel jet of the at least two combustible fuel jets is ignited after the ignition time point.

5 Claims, 2 Drawing Sheets

(51) Int. Cl.
*F02B 75/12* (2006.01)
*F02D 19/10* (2006.01)
*F02D 41/40* (2006.01)

(52) U.S. Cl.
CPC .......... *F02B 2275/14* (2013.01); *F02D 19/10* (2013.01); *F02D 41/403* (2013.01); *F02D 2041/001* (2013.01)

(58) Field of Classification Search
CPC ... F02D 41/40; F02D 41/403; F02D 2041/001
USPC .......................... 123/229–305; 701/102–105
See application file for complete search history.

(56) References Cited

U.S. PATENT DOCUMENTS

| | | | |
|---|---|---|---|
| 8,091,536 B2* | 1/2012 | Munshi | C10L 3/06 123/575 |
| 8,459,576 B2 | 6/2013 | Kim et al. | |
| 9,416,760 B2 | 8/2016 | Kim et al. | |
| 2004/0011323 A1* | 1/2004 | Hilger | F02M 21/0275 123/298 |
| 2005/0279321 A1* | 12/2005 | Crawford | F02B 23/0672 123/260 |
| 2009/0120385 A1 | 5/2009 | Munshi et al. | |
| 2012/0204825 A1 | 8/2012 | Tolbert et al. | |
| 2013/0199501 A1* | 8/2013 | Hou | F02M 51/0603 123/472 |
| 2014/0299105 A1* | 10/2014 | Hou | F02B 23/0672 123/478 |
| 2014/0373806 A1* | 12/2014 | Hou | F02M 26/19 123/294 |
| 2015/0020769 A1* | 1/2015 | Huang | F02D 19/0647 123/305 |

OTHER PUBLICATIONS

Written Notice from the International Search Authority dated Jan. 28, 2019 for International Application No. PCT/EP2018/080679 (8 pages).

* cited by examiner

METHOD FOR OPERATING AN INTERNAL COMBUSTION ENGINE, DUAL FUEL INJECTOR DEVICE, AND INTERNAL COMBUSTION ENGINE DESIGNED FOR CARRYING OUT SUCH A METHOD

CROSS REFERENCE TO RELATED APPLICATIONS

This is a continuation of PCT application No. PCT/EP2018/080679, entitled "METHOD FOR OPERATING AN INTERNAL COMBUSTION ENGINE, DUAL FUEL INJECTOR DEVICE AND INTERNAL COMBUSTION ENGINE DESIGNED FOR CARRYING OUT SUCH A METHOD", filed Nov. 8, 2018, which is incorporated herein by reference.

BACKGROUND OF THE INVENTION

1. Field of the Invention

The present invention relates to a method for operating an internal combustion engine, a dual fuel injector device, and an internal combustion engine designed for carrying out such a method.

2. Description of the Related Art

With high pressure dual fuel combustion methods which are based on direct introduction of a first fuel, typically a gaseous fuel and a second fuel, typically an ignition oil, clean diffusion combustion is normally achieved. As far as possible, simultaneous ignition of all combustible gas jets present in the combustion chamber is herein ideally strived for. This can be achieved for example in that an ignition oil jet is assigned specifically to each combustible fuel jet, wherein the combustible fuel jets make contact with the ignited ignition oil jets preferably already during their introduction into the combustion chamber, thereby being ignited. In the event that such clear assignment of combustible fuel jets on the one hand and ignition oil jets on the other hand is not possible, more ignition oil jets than combustible fuel jets are used generally to ensure in any event that all combustible fuel jets are ignited simultaneously. Especially at certain operating points in a combustion engine, clean diffusion combustion is disadvantageous since, with an at least partially premixed combustion higher peak pressures and/or higher indicated medium pressures as well as an increased efficiency would be achievable.

What is needed in the art is a method for more efficiently operating an internal combustion engine.

SUMMARY OF THE INVENTION

The present invention provides a method for operating an internal combustion engine. The method includes the following steps: at least two combustible fuel jets are introduced simultaneously into a combustion chamber of the internal combustion engine. A first combustible fuel jet of the at least two combustible fuel jets is ignited at an ignition time point. In a first operating mode of the internal combustion engine it is herein provided that a second combustible fuel jet which is different from the first combustible fuel jet of the at least two combustible fuel jets is ignited after the ignition time point. By way of this procedure a combination of diffusion combustion and a premixed combustion is provided in the first operating mode, wherein due to its later ignition the first combustible fuel jet combusts in particular by way of diffusion combustion, wherein due to its later ignition more time is available to the second combustible fuel jet to blend with the available combustion air in the combustion chamber, so that it can burn at least partially in the form of a premixed combustion. The combustion is divided into two ignition events, due to which an expanded pressure maximum or two separate pressure maximums— chronologically viewed—are present in the combustion chamber. It is thus possible to increase the indicated medium pressure at a given peak pressure, wherein especially a balanced pressure process is better approximated than with conventional combustion control, especially in that the pressure in the combustion chamber is maintained for a longer time near the peak pressure value. If an interval is maintained to a maximum possible peak pressure—in particular a peak pressure defined by maximum loads—approximation to an Otto cycle is also possible. With regard to emission of the internal combustion engine the components of the diffusion combustion on the one hand and the premixed combustion on the other hand can be otherwise optimized. Due to premixing, the fuel of the second combustible fuel jet is made lean locally so that the flame temperature drops, and lower emissions occur.

Implementation of the method is not limited to dual fuel internal combustion engines. It is only important that a plurality of combustible fuel jets are introduced directly into the combustion chamber, wherein at least one of the combustible fuel jets is ignited later than at least one other fuel jet of the combustible fuel jets. The method may be used in a dual fuel operation of an internal combustion engine.

When the combustible fuel jets are introduced into the combustion chamber simultaneously, this means in particular that the combustible fuel jets are introduced into the combustion chamber at the same point in time except for a possible—for technical reasons—unavoidable time offset. The various combustible fuel jets are thus not combustible fuel jets that are allocated to different injection occurrences, for example pre-injection, main injection or after injection. The combustible fuel jets are in fact allocated to the same injection occurrence.

Introduction of the combustible fuel jets directly into the combustion chamber is understood in particular to be a direct injection, for example by way of a fuel gas injector.

According to a further aspect of the invention it is provided that the second combustible fuel jet is ignited by the first ignited combustible fuel jet. The flame front of the first combustible fuel jet spreads in the combustion chamber and after a certain time captures the second combustible fuel jet, which then ignites due to the first ignited combustible fuel jet and in particular due to the combustible products in the first combustible fuel jet. In this state, the second combustible fuel jet is already made locally lean and mixed with the combustion air, so that a rapid conversion of the premixed second combustible fuel jet increase in the combustion chamber with rapid pressure increase.

According to a further aspect of the invention it is provided that the first combustible fuel jet is ignited by way of pilot injection of an ignition oil into the combustion chamber. For the purpose of ignition, a certain ignition oil jet may be allocated firmly to the first combustible fuel jet. The second combustible fuel jet is therein spaced apart from the specified ignition oil jet and the first combustible fuel jet, that it is not ignited by the specified ignition oil jet. It is in fact ignited later by the ignited first combustible fuel jet.

A plurality of more than two combustible fuel jets may be introduced simultaneously into the combustion chamber of the internal combustion engine, wherein preferably one ignition oil jet is allocated to each combustible fuel jet of a sub number of the combustible fuel jets which is smaller than the total number of combustible fuel jets. Those combustible fuel jets to whom no ignition oil jet is allocated are ignited at a later time by the ignited combustible fuel jets.

A plurality of combustible fuel jets which are arranged in circumferential direction—especially concentrically—around a longitudinal axis of the combustion chamber may be introduced into the combustion chamber, wherein each non-ignited combustible fuel jet is arranged between two ignited combustible fuel jets and is surrounded in particular by two ignited combustible fuel jets. It is then ignited at a later time on both sides by the immediately adjacently located ignited combustible fuel jets.

For example, nine combustible fuel jets may be introduced into the combustion chamber, wherein six ignition oil jets are introduced into the combustion chamber, wherein each of the six ignition oil jets respectively are allocated to a combustible fuel jet in such a manner that six first combustible fuel jets are ignited by the six ignition oil jets, wherein three second combustible fuel jets are not ignited by an ignition oil jet and are arranged respectively between two first combustible fuel jets.

According to a further aspect of the invention it is provided that the internal combustion engine is operated parameter dependent—alternatively to the first operating mode—in a second operating mode, wherein all combustible fuel jets are ignited simultaneously at one ignition time. In this second operating mode, a diffusion combustion is thus achieved. The second operating mode is employed in particular subject to at least one operating parameter of the internal combustion engine. A momentary load point of the internal combustion engine may be used as the at least one operating parameter. Subject to the at least one operating parameter, the internal combustion engine is then operated in either the first operating mode or the second operating mode. At full load, the internal combustion engine may be operated in the second operating mode, since lower peak pressures occur in diffusion combustion, thus preserving the internal combustion engine. At partial load and/or no load the internal combustion engine may be operated in the first operating mode, wherein the higher premix proportion of the combustion at a given fuel mass and recorded ignition time point would lead to higher peak pressures which however is not detrimental with partial load or no load since in this case the fuel mass introduced into the combustion chamber compared to full load is reduced, so that again the higher peak pressures in themselves are also reduced. The internal combustion engine can therefore be operated damage free in partial load and/or no load in the first operating mode. Consequently, a balanced pressure process can herein be better approximated, resulting in efficiency advantages and reduced emissions.

By choosing between the first operating mode on the one hand and the second operating mode on the other hand an additional degree of freedom regarding shaping of the process is provided which can be utilized advantageously in various ways: in particular for an increase in performance at constant peak pressure; for an increase in the degree of efficiency; for variable distribution of premix combustion and diffusion combustion, especially in regard to the emission of the internal combustion engine; for thermal management of the internal combustion engine; and also for approximation of an Otto cycle while adhering to peak pressure reserves.

According to a further aspect of the invention it is provided that switching between the first operating mode and the second operating mode is implemented by way of changing a load rotation in the combustion chamber. In this respect it is demonstrated that if no load rotation is present in the combustion chamber, the combustible fuel jets on the one hand and the ignition oil jets on the other hand—viewed cross sectionally—are aligned radially relative to the longitudinal axis of the combustion chamber, wherein clearly a combustible fuel jet can be allocated to each ignition oil jet. Above a certain force of a load rotation in the combustion chamber the combustible fuel jets and possibly also the ignition oil jets drift, so that combustible fuel jets can also be ignited by ignition oil jets which are not directly allocated to them. It is in particular also possible that with a certain load rotation in the combustion chamber all combustible fuel jets can ae ignited by the ignition oil jets. Thus, it is possible to switch from the first operating mode into the second operating mode by increasing the load rotation in the combustion chamber. Conversely, switching from the second operating mode back into the first operating mode can be accomplished by reducing the load rotation in the combustion chamber.

Load rotation is understood in particular to be a rotating motion of combustion air in the combustion chamber around the longitudinal axis of the combustion chamber.

Alternatively or in addition it is however also possible that switching between the first operating mode and the second operating mode is caused by delaying the introduction of the combustible fuel jets and thereby at the same time that of the ignition time point. The underlying idea herein is that the load motion in the combustion chamber is subject to a time-related development. It is therefore possible that the combustible fuel jets can be introduced into the combustion chamber at a first point in time at a lower load rotation, whereby they can be introduced into the combustion chamber at a higher load rotation at a second point in time which is different from the first point in time. By adapting introduction of the combustible fuel jets into the combustion chamber in a time-related manner to the development of the load rotation, either the first operating mode or the second operating made can be implemented.

According to a further aspect of the invention it is provided that the load rotation in the combustion chamber is altered in that the activation of a variable valve train that is allocated to the combustion chamber is changed. The load movement in the combustion chamber and in particular the load rotation can be influenced in particular through suitable control of a variable valve train, for example a fully variable valve train. It is therefore possible to switch between the first operating mode through activation of the variable valve drive.

Alternatively or in addition switching from the first operating mode into the second operating mode can be accomplished by changing the time an injector is energized for introduction of the combustible fuel jets and preferably for introduction of the ignition oil jets, wherein the introduction of the combustible fuel jets and also the ignition point in time can be delayed. The current flow times for injection of the combustible fuel jets and the current flow times for introduction of the ignition oil jets are preferably changed jointly in the same manner. Current flow times are changed accordingly in particular for controlling a dual fuel injector device which is designed to introduce the combustible fuel jets on the one hand and the ignition oil jets on the other hand into the combustion chamber.

The present invention further provides a dual fuel injector device. The dual fuel injector device is designed for introduction of a combustible fuel jet and an ignition gas jet directly into a combustion chamber of an internal combustion engine. The dual fuel injector device includes a first number of first bores for delivery of a plurality of combustible fuel jets, and a second number of second bores for delivery of a plurality of ignition oil jets, wherein the first number of first bores is greater than the second number of second bores. In this manner it is possible to ignite only a sub-number of the combustible fuel jets with the ignition oil jets, whereas other fuel gas jets are not ignited by the ignition oil jets. A first bore may hereby be allocated to every second bore, whereby first bores exist to which no second bore is allocated. Special advantages result in connection with the dual fuel injector device which were already discussed in the context of the method.

According to a further aspect of the invention it is provided that to each second bore a first bore is firmly allocated for ignition of the respective combustible fuel jet of the first bore by the ignition oil that is delivered through the second bore. The second bores on the one hand and the first bores on the other hand are notably preferably arranged spatially/geometrically in such a manner that the corresponding firm allocation of the second bore to the respective first bore is obtained.

According to a further aspect of the invention it is provided that the first bores and the second bores are arranged axially offset to one another. Viewed in longitudinal direction of the combustion chamber they are in particular arranged on different planes. The first bores are herein may be arranged above the second bores, in other words on one side of the second bores which face away from a piston that is arranged movably in the combustion chamber. In this way the combustible fuel jets can be ignited by the ignition oil jets which are located below them.

An axial direction is herein in particular a longitudinal direction of the dual fuel injector device which may be aligned with the intended arrangement of the longitudinal axis of the combustion chamber. A radial direction is perpendicular to the axial direction. A circumferential direction encompasses the axial direction concentrically.

It may be provided that—viewed in circumferential direction—each of the second bores aligns with a first bore allocated to it. The first and second bores which are allocated to each other are thus located in a same angle position axially above one another. In this manner it is very efficiently assured that only the combustible fuel jets allocated respectively to the second bores are ignited by the ignition oil. Alternatively, the first and second bores allocated to one another can also be offset in circumferential direction, especially at a distance. Taking into account a load rotation in the combustion chamber and in particular a delay in ignition, a partial ignition of the combustible fuel jets directly by way of the ignition oil jets can also result.

The invention further provides an internal combustion engine which is designed to implement the method according to the invention or a method according to one of the previously described embodiments. With reference to the internal combustion engine particular advantages arise which were already described in the context of the method and/or the dual fuel injector device. The internal combustion engine includes may include a dual fuel injector device according to the invention or a dual fuel injector device according to one of the previously described design examples.

For switching between the first operating mode and the second operating mode, the internal combustion engine includes a variable valve train which is allocated to the at least one combustion chamber, and/or energizing times for the dual fuel injector device are variable in the internal combustion engine.

The internal combustion engine may be designed as a reciprocating piston engine. It is possible that the internal combustion engine is designed to drive an automobile, a truck or a commercial vehicle. In one embodiment, the internal combustion engine may serve to drive especially heavy land and watercraft, for example mining vehicles, trains, wherein the internal combustion engine is used in a locomotive or a rail car, or ships. Use of the internal combustion engine to drive defense related vehicles, for example tanks, is also possible. The internal combustion engine may also be utilized in a stationary manner, for example for stationary energy supply in emergency power operations, continuous load operations or peak load operations, wherein the internal combustion engine in this case preferably powers a generator. Stationary applications of the internal combustion engine to power auxiliary units—for example fire pumps on drilling platforms—are also possible. Utilization of the internal combustion engine in mining of fossil raw material in particular fossil fuel, for example oil and/or gas is also possible. Use of the internal combustion engine is also possible in industrial applications or in construction, for example in construction machinery or construction vehicles, for example a crane or an excavator. The internal combustion engine is for example a diesel engine, a gasoline engine, a gas powered engine designed for operation with natural gas, biogas, special gas or another suitable gas. In particular, if the internal combustion engine is designed as a gas motor, it is suitable for application in a cogeneration unit for stationary energy production.

The description of the method on the one hand and the dual fuel injector device and the internal combustion engine on the other hand are to be understood as being complimentary to one another. Process steps which were described explicitly or implied in connection with the dual fuel injector device and/or the internal combustion engine are may be individual or combined steps of an embodiment of the method. Features of the dual fuel injector device and/or the internal combustion engine which were discussed explicitly or implied in connection with the method may be individual or combined features of an embodiment of the dual fuel injector device and/or the internal combustion engine. The method may be characterized by at least one process step which is contingent upon at least one feature of an inventive or embodiment of the dual fuel injector device or the internal combustion engine. The dual fuel injector device and/or the internal combustion engine may be characterized by at least one feature which is contingent upon at least one step of an inventive embodiment of the method.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
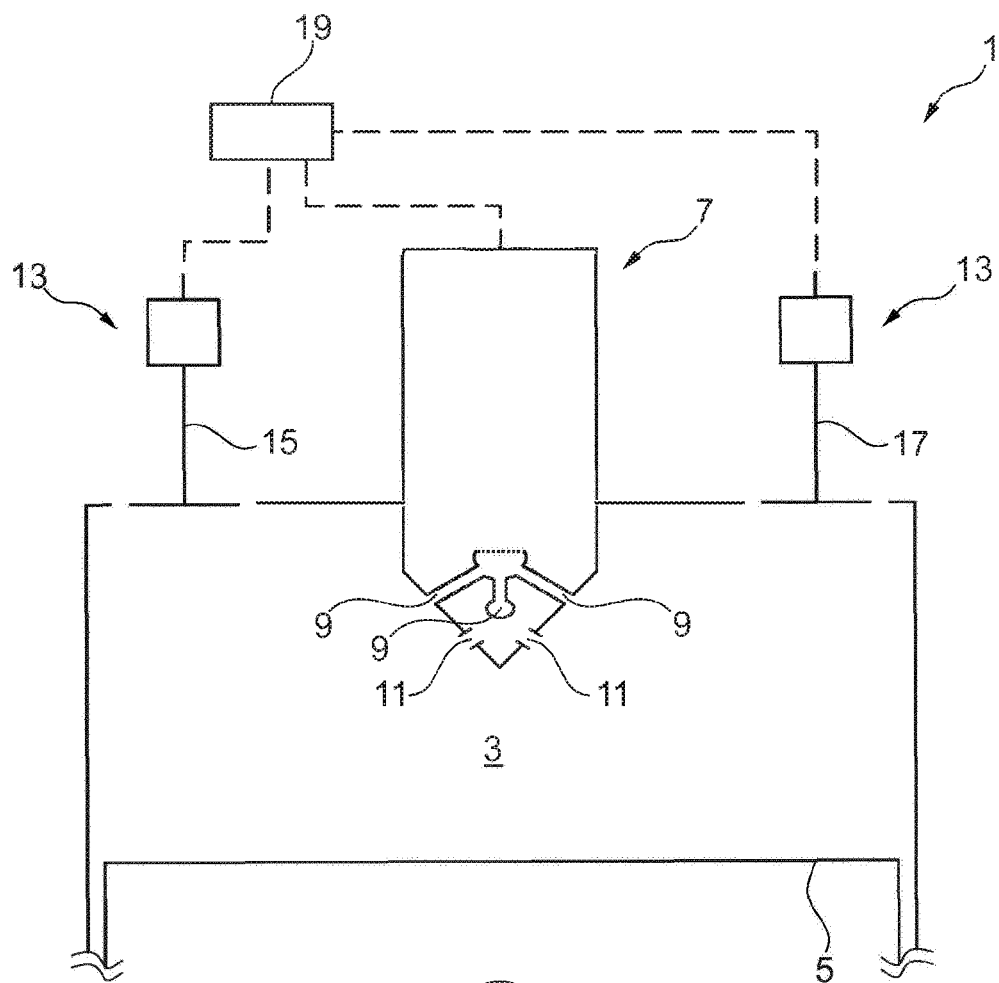
FIG. 1 illustrates a schematic representation of an embodiment of an internal combustion engine with an embodiment of a dual fuel injector device.

FIG. 1 is a schematic representation of an embodiment of an internal combustion engine 1 with a combustion chamber 3. Internal combustion engine 1 may include a plurality of combustion chambers 3. The combustion chambers 3 may be identical. It is possible that internal combustion engine 1 includes four, six, eight, ten, twelve, fourteen, sixteen, eighteen or twenty combustion chambers 3.

Internal combustion engine 1 may be a reciprocating piston engine, wherein in combustion chamber 3, a piston 5 is movable in a reciprocating motion.

Internal combustion engine 1 has a dual fuel injector device 7 which is configured to introduce a combustible fuel on the one hand and an ignition oil on the other hand directly into combustion chamber 3. The dual fuel injector device 7 includes a first number of first bores 9 to deliver a plurality of combustible fuel jets—one combustible fuel jet from each first bore 9. Dual fuel injector device 7 moreover includes a second number of second bores 11 to deliver a plurality of ignition oil jets—in particular one ignition oil jet respectively from each of second bores 11. The first number of first bores 9 is thereby greater than the second number of second bores 11.

Within the scope of one embodiment of a method for operating internal combustion engine 1 it is provided that at least two combustible fuel jets are simultaneously introduced by first bores 9 directly into combustion chamber 3, wherein a first combustible fuel jet of the at least two combustible fuel jets are ignited at one ignition time point. It is moreover provided that in a first operating mode of internal combustion engine 1 a second combustible fuel jet which is different from the first combustible fuel jet of the at least two combustible fuel jets is ignited after the ignition time. In this manner, a combination of diffusion combustion and a premixed combustion can be provided in the first operating mode on the one hand, and a premixed combustion on the other hand can be realized, whereby in particular an increase in output at constant peak pressure, increase in efficiency and better approximation to a balanced pressure process are possible.

The second combustible fuel jet may be ignited by the first ignited combustible fuel jet, wherein it is ignited in particular by combustible products in the first combustible fuel jet. In contrast, the first combustible fuel jet may be ignited by way of the pilot injection of the ignition oil, consequently by at least one ignition oil jet from a second bore 11.

Dual fuel injector device 7 has preferably nine first bores 9 and six second bores 11, so that within the scope of the method also a total of nine combustible fuel jets and six ignition oil jets are introduced directly into combustion chamber 3.

A first bore 9 is preferably firmly allocated to each second bore 11 for ignition of the respective combustible fuel jet by way of the respectively allocated ignition oil jet, wherein bores 9, 11 are arranged in particular relative to one another so that a correspondingly firm allocation of first bores 9 to second bores 11 results. It can thus be ensured that in the first operating mode, only those combustible fuel jets are ignited to whose first bores 9 a second bore 11 is allocated.

The first bores 9 and second bores 11 may be arranged axially offset to one another, wherein preferably every second bore 11 aligns with a first bore 9 allocated to it—viewed in circumferential direction. The circumferential direction extends concentrically around a longitudinal axis in combustion chamber 3 in FIG. 1, in other words around a vertical center axis of combustion chamber 3. Alternatively, first and second bores 9, 11 allocated to one another can also be offset in the circumferential direction, especially at a distance. Taking into account a load rotation in combustion chamber 3 and in particular a delay in ignition, a partial ignition of the combustible fuel jets directly by way of the ignition oil jets can also result.

First bores 9 and second bores 11 are arranged distributed in the circumferential direction—for example symmetrically—in particular always with the same angle distances to one another within the same bore type, in other words within first bores 9 and second bores 11. It is thereby provided that each first bore 9 to which a non-ignited combustible fuel jet is allocated in the first operating mode is framed between two first bores 9 to which ignited combustible fuel jets that are ignited at the ignition time point are allocated in the first operating mode.

In a second operating mode, internal combustion engine 1 is operated parameter dependent, wherein all combustible fuel jets are ignited simultaneously at one ignition time. Switching between the first operating mode and the second operating mode may occur subject to at least one parameter. A momentary load point of the internal combustion engine may be used as the at least one parameter. The internal combustion engine may herein be operated at full load in the second operating mode, whereas in the first operating mode it is operated in partial load or no load, in other words with a higher share of premixed combustion.

Switching between the first operating mode and the second operating mode may occur by changing a load rotation in combustion chamber 3, and/or by delaying the introduction of the combustible fuel jets and of the ignition time point. For changing the load rotation, a variable valve train 13 may be provided, wherein in this case an inlet valve 15 and an outlet valve 17 is allocated to combustion chamber 3, and wherein a variable valve train 13 is allocated to inlet valve 15 as well as to outlet valve 17. It is however also possible that a variable valve train 13 is allocated to only one gas switching valve, selected from inlet valve 15 and outlet valve 17. It can in particular be sufficient for rotation change if a variable valve train 13 is allocated to inlet valve 13.

Specifically for controlling switching between the first operating mode and the second operating mode, however preferably also for control of the internal combustion engine overall, the internal combustion engine includes a control unit 19 which here is schematically operatively connected with dual fuel injector device 7 and variable valve train 13.

Figure 2:
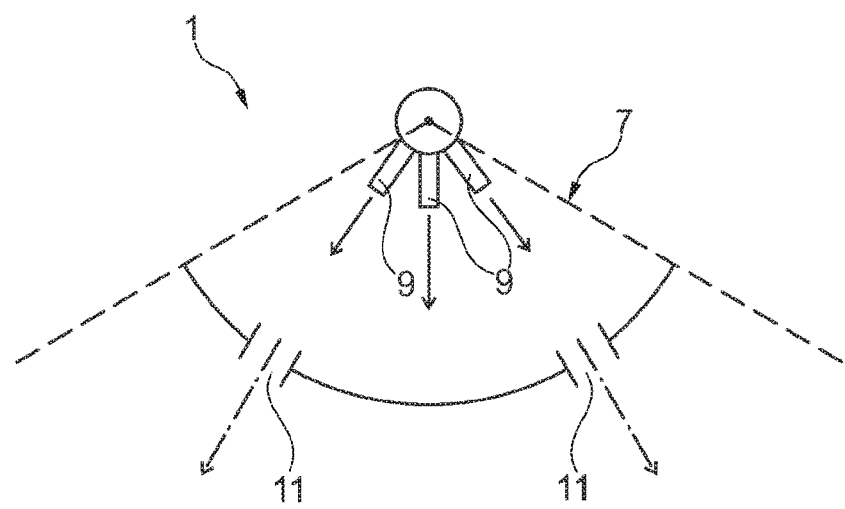
FIG. 2 illustrates a detailed illustration of the internal combustion engine according to FIG. 1, for explanation of its operating mode.

FIG. 2 is a schematic detailed illustration of internal combustion engine 1. Same, and functionally same elements are identified with the same reference characters, so that in this respect we refer to the previous description. FIG. 2 shows a detail of dual fuel injector device 7, in particular in the form of a schematic partial cross sectional illustration along an angle region of 120°, whereby dual injector device 7 may be designed axially symmetric so that the entire cross section can be maintained by copying the illustrated structure into the remaining two 120° segments. It thus becomes clear that dual fuel injector device 7 may include a total of nine first bores 9 (of which three first bores 9 are illustrated here) and six second bores 11 (of which two second bores 11 are illustrated here). At the same time it becomes clear that a second bore 11 may be allocated respectively to the herein outer first bores 9, so that the combustible fuel jets delivered by the outer first bores 9 are ignited by the ignition oil jets delivered by second bores 11. In contrast, no second bore 11 is allocated to central first bore 9, so that a combustible fuel jet emitted from center bore 9—depending in particular on the timing of the introduction and a momentary load rotation in combustion chamber 3 at the time of the introduction—in the first operating mode is not ignited by the ignition oil jets at the ignition time point. Rather, it is ignited at a later time point by the ignited outer combustible fuel jets, after occurrence of certain blending with the combustion air that is present in combustion chamber 3.

In contrast, in the second operating mode of internal combustion engine 1, a load rotation in combustion chamber 3 is high enough so that the combustible fuel jets on the one hand and the ignition oil jets on the other hand drift sufficiently so that all combustible fuel jets are ignited at the ignition point in time by the ignition oil jets.

Figure 3:
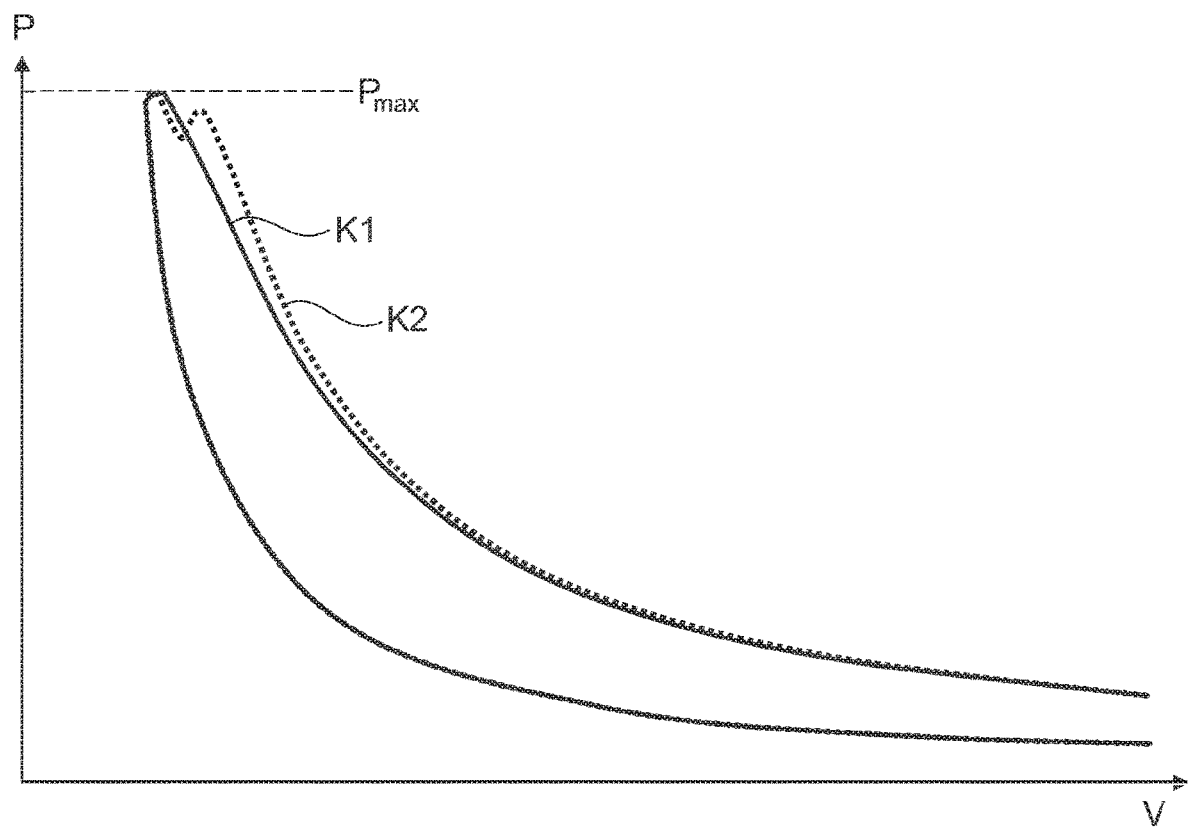
FIG. 3 illustrates a schematic diagram of the function of a method for operating the internal combustion engine.

FIG. 3 is a schematic diagram of one embodiment of a method for operating the internal combustion engine. It shows a pressure volume diagram wherein a pressure p in the combustion chamber is applied on the vertical axis, wherein on the horizontal axis a momentary volume V of combustion chamber 3 is shown. The pressure progression in the second operating mode of the internal combustion engine, when all combustible fuel jets are ignited simultaneously in combustion chamber 3 at the ignition time point is illustrated by solid curve K1. Dotted curve K2 illustrates the pressure progression above the momentary combustion chamber volume for the first operating mode, wherein the same combustible fuel mass was introduced into combustion chamber 3 for both curve progression. The time point of introduction of at least the combustible fuel, preferably however of the combustible fuel and the ignition oil was advanced by 2° KW for the first operating mode relative to the second operating mode, in order to achieve the same peak pressure $P_{max}$ with the same combustible fuel mass. The same peak pressure $P_{max}$ is thereby achieved in spite of the advance shift because only a sub-number of combustible fuel jets are ignited at the ignition time point in the first operating mode. Otherwise, the advance shift would result in an increase of the peak pressure.

Based on FIG. 3 it is apparent that in the second operating mode a maximum is only achieved by the solid pressure-volume-curve, in other words peak pressure $P_{max}$, whereby the curve comparatively strongly drops off thereafter.

In contrast, in the first operating mode the premixed combustion of the combustion fuel jets which were not ignited at the ignition time point occurs after the ignition time point, so that the pressure increases again following an initial decrease and comes close again to peak pressure $P_{max}$. The pressure-volume curve decreases sharply only after this premixed combustion. Thus, a higher pressure near peak pressure $P_{max}$ can be maintained over a longer time period, in particular over a longer crankshaft angle range, so that the combustion progression in combustion chamber 3 in the first operating mode approximates to a balanced pressure process.

In FIG. 3 it can also be seen that the area enclosed by dotted curve K2 is larger than the area enclosed by solid curve K1, which means that in the first operating mode more work is performed than in the second operating mode. Since however—as previously mentioned—in both cases the same combustible fuel mass is introduced into combustion chamber 3, efficiency in the first operating mode is greater than in the second operating mode.

It is thus possible with the herein suggested method and internal combustion engine 1 to achieve an increase in efficiency. Moreover, by switching between the first operating mode and the second operating mode a variable distribution of premixed combustion on the one hand and diffusion combustion on the other hand—in particular in regard to different emission scenarios—can occur.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating an internal combustion engine, the internal combustion engine including a combustion chamber, the method including:
   providing a fuel injector device for the internal combustion engine;
   introducing, by the fuel injector device, at least two combustible fuel jets concurrently into the combustion chamber of the internal combustion engine, wherein the at least two combustible fuel jets include a first combustible fuel jet and a second combustible fuel jet which is different from the first combustible fuel jet;
   igniting the first combustible fuel jet of the at least two combustible fuel jets at an ignition time point; and
   igniting the second combustible fuel jet of the at least two combustible fuel jets after the ignition time point in a first operating mode of the internal combustion engine, wherein the first combustible fuel jet is ignited by a pilot injection of an ignition oil from an ignition oil jet into the combustion chamber, and wherein the second combustible fuel jet is spatially distanced from the ignition oil jet that is assigned to the first combustible fuel jet for its ignition, the ignition oil jet being spatially distanced from the first combustible fuel jet in such a way that the second combustible fuel jet is not ignited by the ignition oil jet, the second combustible fuel jet being later ignited by the first combustible fuel jet.

2. The method according to claim 1, further including a step of igniting, simultaneously, the first combustible fuel jet and the second combustible fuel jet at one ignition time point in a second operating mode of the internal combustion engine, and wherein the internal combustion engine is operated in a parameter dependent manner in the second operating mode of the internal combustion engine.

3. The method according to claim 2, further including a step of switching between the first operating mode and the second operating mode by at least one of:
   changing a load rotation in the combustion chamber; and
   delaying the step of introducing the at least two combustible fuel jets to delay the ignition time point.

4. The method according to claim 1, wherein the combustion chamber has a load rotation, and a change in the load rotation is initiated by a change in activation of a variable valve train which is allocated to the combustion chamber.

5. The method according to claim 1, wherein the fuel injector device is in the form of a dual fuel injector device, wherein the dual fuel injector device is set up to ignite with ignition oil jets only a sub-number of combustion fuel jets, while other combustion fuel jets are not ignited by the ignition oil jets.

\* \* \* \* \*